(12) United States Patent
Yoshida

(10) Patent No.: US 8,949,202 B2
(45) Date of Patent: Feb. 3, 2015

(54) TECHNIQUE FOR CONTROLLING ACCESS TO DATA

(75) Inventor: Ryo Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 11/950,762

(22) Filed: Dec. 5, 2007

(65) Prior Publication Data

US 2008/0162484 A1    Jul. 3, 2008

(30) Foreign Application Priority Data

Dec. 27, 2006   (JP) .................................. 2006-351090

(51) Int. Cl.
*G06F 17/30* (2006.01)
*G06F 21/62* (2013.01)

(52) U.S. Cl.
CPC .... *G06F 21/6218* (2013.01); *G06F 2221/2141* (2013.01)
USPC .......................................... 707/694; 707/693

(58) Field of Classification Search
USPC ...................... 707/999.009, 999.01
See application file for complete search history.

(56) References Cited

U.S. PATENT DOCUMENTS

| | | | |
|---|---|---|---|
| 5,113,442 A | | 5/1992 | Moir |
| 6,189,036 B1 * | | 2/2001 | Kao ............................... 709/229 |
| 6,275,936 B1 * | | 8/2001 | Kyojima et al. .............. 713/182 |
| 6,931,402 B1 * | | 8/2005 | Pereira, III ............................ 1/1 |
| 2002/0040364 A1 * | | 4/2002 | Saito et al. ......................... 707/9 |
| 2003/0131115 A1 * | | 7/2003 | Mi et al. ......................... 709/229 |
| 2005/0044426 A1 * | | 2/2005 | Vogel et al. .................... 713/202 |
| 2005/0289150 A1 * | | 12/2005 | Kudo ............................... 707/10 |
| 2006/0015501 A1 * | | 1/2006 | Sanamrad et al. ................ 707/9 |
| 2007/0050852 A1 * | | 3/2007 | Yoshii et al. .................... 726/27 |
| 2007/0276835 A1 * | | 11/2007 | Murthy ............................. 707/9 |

FOREIGN PATENT DOCUMENTS

| | | |
|---|---|---|
| JP | 7015440 A | 1/1995 |
| JP | 2005-092891 | 4/2005 |
| JP | 2006-048220 | 2/2006 |

OTHER PUBLICATIONS

"Information Materials for IDS", Japanese Office Action Dated Jun. 2, 2009.

* cited by examiner

*Primary Examiner* — Mohammad S Rostami
(74) *Attorney, Agent, or Firm* — Hoffman Warnick LLC

(57) ABSTRACT

Access control with easy change/extension is implemented. Access to data is controlled by a first storage unit that stores a plurality of attribute values respectively selected from a plurality of integers which are relatively prime and identifying a plurality of attributes of users, in association with respective users a second storage unit that stores a product of at least two attribute values which are common to users belonging to a set of users, in association with respective data to be accessed, to show the set of users which are targets of controlling access to the data. A plurality of attribute values corresponding to a user who requests access are read from the first storage unit, and a product of at least two of the plurality of read attribute values is calculated. The user is accepted as a target of controlling access to the data, on condition that the calculated product of attribute values matches a product of attribute values stored in the second storage unit in association with the data to be accessed.

15 Claims, 8 Drawing Sheets

| USER ID | ATTRIBUTE | | | | CACHE | | |
|---|---|---|---|---|---|---|---|
| | DEPARTMENT | JOB TITLE | LOCATION | GROUP | A | B | C |
| USER 1 | 103 (DISTRIBUTION) | 3 (MANAGER) | 11 (EASTERN JAPAN) | 67 (GROUP B) | 309 | 1133 | 103 |
| USER 2 | 103 (DISTRIBUTION) | 2 (ASSISTANT MANAGER) | 11 (EASTERN JAPAN) | 61 (GROUP A) | 206 | 1133 | 103 |
| USER 3 | 103 (DISTRIBUTION) | 3 (MANAGER) | 13 (WESTERN JAPAN) | 61 (GROUP A) | 309 | 1339 | 103 |
| USER 4 | 101 (SALES) | 3 (DIRECTOR) | 11 (EASTERN JAPAN) | 61 (GROUP A) | 303 | 1111 | 101 |
| ...... | ...... | ...... | ...... | ...... | ...... | ...... | ...... |

FIG. 3

| PAGE ID | PRODUCT OF ATTRIBUTE VALUES | TYPE INFORMATION |
| --- | --- | --- |
| PAGE 1-1 | 103 | REFERENCE |
| PAGE 1-2 | 1133 | REFERENCE |
| PAGE 1-2 | 1339 | UPDATE |
| PAGE 1-3 | 1339 | REFERENCE |
| PAGE 2-1 | 183 | UPDATE |
| PAGE 2-1 | 201 | REFERENCE |
| PAGE 2-2 | 183 | REFERENCE |

| PAGE ID | CONDITION | TYPE INFORMATION |
|---|---|---|
| PAGE 1-1 | (JOB TITLE) =EXECUTIVE OR (DEPARTMENT) = SYSTEM | UPDATE |
| PAGE 1-2 | (JOB TITLE) =EXECUTIVE OR (DEPARTMENT) = SYSTEM | UPDATE |
| PAGE 1-3 | (JOB TITLE) =EXECUTIVE OR (DEPARTMENT) = SYSTEM | UPDATE |
| PAGE 2-1 | (JOB TITLE) =EXECUTIVE OR (DEPARTMENT) = SYSTEM | UPDATE |
| PAGE 2-2 | (JOB TITLE) =EXECUTIVE OR (DEPARTMENT) = SYSTEM | UPDATE |

TECHNIQUE FOR CONTROLLING ACCESS TO DATA

FIELD OF THE INVENTION

The present invention relates to a technique for controlling access to data and screen. More particularly, the present invention relates to a technique for determining whether access to data is granted or denied, based on attributes of a user.

BACKGROUND OF THE INVENTION

In recent years, a large number of pages with a hierarchical structure have been created using World Wide Web technology such as hyperlinks, and such pages have been widely used not only on the Internet but also on intranets. A large website with a large number of pages is built assuming that the website is accessed by multiple users having a variety of attributes. For example, there is a case in which, for appropriate information management within a company, browsable pages are restricted by department, position, job title, or the like. Also, there is a case in which when a database is updated by an operation performed on a page, a determination as to whether to allow for the update may be made according also to attributes of a user.

Examples of techniques for access control can be found, for example, in Japanese Unexamined Patent Publication (Kokai) No. 2005-92891 and Japanese Unexamined Patent Publication (Kokai) No. 2006-48220.

Conventionally, such access control is reflected in the design of software for access control and implemented by the software being operated on a web server or the like. For example, design specifications that "if the attribute of a user is a specific attribute, then the user is allowed to refer to a given page" are implemented by a database in which an attribute is stored for each user, a database in which an attribute of a user to whom access is granted is stored for each page, and a program that determines, based on the attribute stored in the databases, whether to grant or deny access. Thus, to change access control or add an attribute or page, there is a need to change the databases or program.

For example, when a database is in a table format including a plurality of rows provided for each page and a plurality of columns provided for each attribute, a new column needs to be added to the table, in order to add an attribute. A process of adding a column to the table takes a very long time, depending on the type of database or the data size. In order to eliminate the need to change access control, it may be considered to enable setting of sufficient types of attributes in advance; however, it is almost impossible to fully predict future modifications and prepare in advance for attributes.

SUMMARY OF THE INVENTION

The present invention provides a system, method, and program product for determining whether access to data is granted or denied, based on attributes of a user.

According to a first aspect of the present invention, there is provided a system for controlling access to data, comprising: a first storage unit for storing a plurality of attribute values respectively selected from a plurality of integers which are relatively prime and identifying a plurality of attributes of users, in association with respective users; a second storage unit for storing a product of at least two attribute values which are common to users belonging to a set of users, in order to show, in association with respective data to be accessed, the set of users as targets of access control to the data; a calculation unit for reading out, from the first storage unit, a plurality of attribute values corresponding to a user who requests access, and calculating a product of at least two of the plurality of read attribute values; and a control unit for performing a process for accepting the user as a target of controlling access to the data, on condition that the calculated product of attribute values matches a product of attribute values stored in the second storage unit in association with the data to be accessed. In addition, there are provided a program product for allowing an information processing apparatus to function as the system and a method for controlling access using the system.

It is to be understood that the aforementioned summary of the invention does not list all necessary features of the present invention and thus any sub-combination of groups of these features can also fall within the invention.

BRIEF DESCRIPTION OF THE DRAWINGS

These and other aspects and features of the present invention will be more readily understood from the following detailed description of the various aspects of the invention taken in conjunction with the accompanying drawings.

FIG. 3 is a diagram showing an exemplary data structure of a first storage unit.

DETAILED DESCRIPTION OF THE INVENTION

Although the present invention will be described below through an embodiment of the present invention, the following embodiment is not intended to limit the inventions as set forth in the appended claims and all combinations of features described in the embodiment are not always necessary to the solving means of the present invention.

Figure 1:
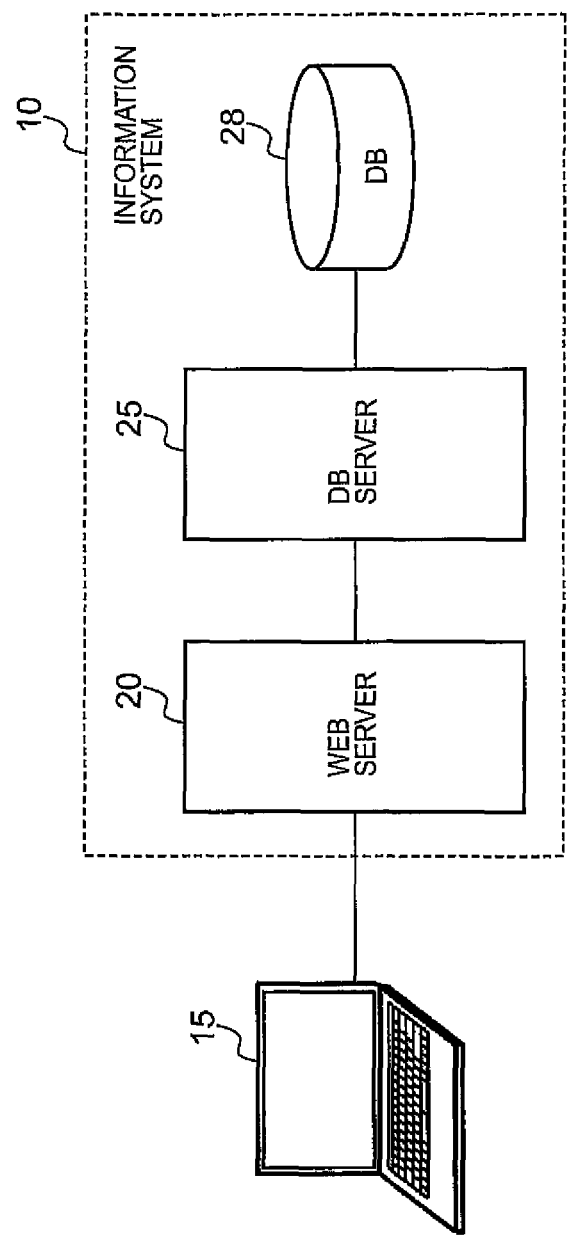
FIG. 1 is a diagram showing the overall configuration of an information system according to an embodiment of the present invention.

FIG. 1 shows the overall configuration of an information system 10 according to an embodiment of the present invention. The information system 10 includes a web server 20, a DB server 25, and a database 28. When the web server 20 communicates with an external terminal apparatus 15 and receives a request from a user to display a web page, the web server 20 creates a requested web page and transmits, as a response, the web page to the terminal apparatus 15. In the process of creating a web page to be displayed, access to the database 28 may be required. In such a case, the web server 20 instructs the DB server 25 to read out necessary data from the database 28 or to update data contained in the database 28.

For such World Wide Web technology, standardization of the technology is advanced and a website including a plurality of web pages can be created at low cost and with high quality and thus the World Wide Web technology is widely spread. Hence, it is often the case that a system such as the information system 10 is simultaneously and parallelly accessed by a large number of users on a company intranet, for example. The information system 10 according to the present embodiment supports such an application and is intended to facilitate, when access to a web page is restricted on a per-user basis, the extension/change of access restriction which is once set.

Figure 2:
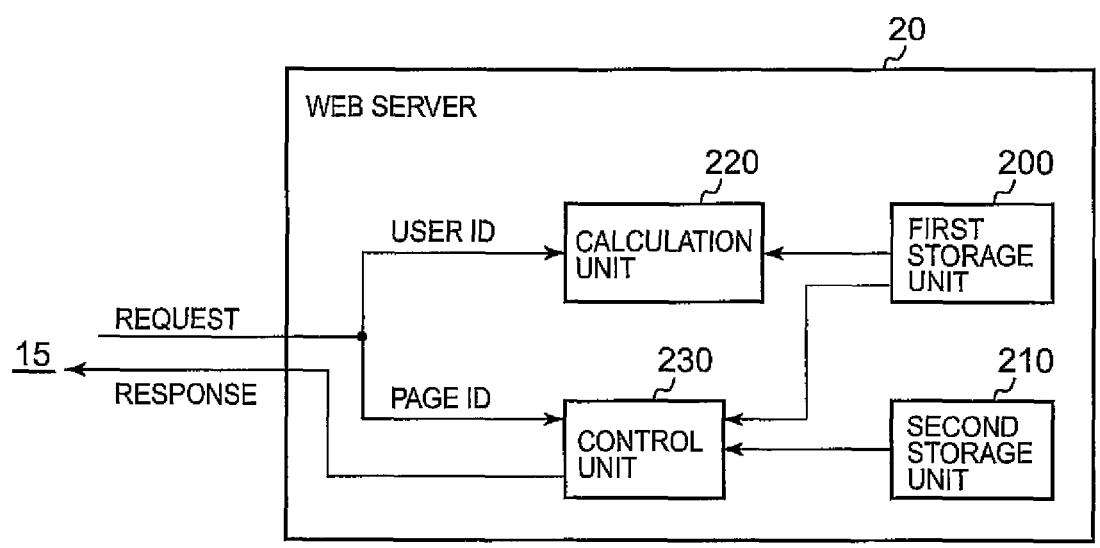
FIG. 2 is a diagram showing a functional configuration of a web server.

FIG. 2 shows a functional configuration of the web server 20. The web server 20 has a first storage unit 200, a second storage unit 210, a calculation unit 220, and a control unit 230. The first storage unit 200 stores a plurality of attribute values which identify a plurality of attributes of users in association with respective users. The attribute values are selected in advance from a plurality of integers which are relatively prime and assigned. For example, the attribute values may be selected from a combination of only prime numbers, such as 2, 3, 5, and 7, or may be selected from a combination of not only prime numbers but also integers which are relatively prime, such as 13, 15, 17, 32, and 77.

The second storage unit 210 is provided to show, in association with respective data to be accessed, a set of users as targets of access control to the data, and stores a product of at least two attribute values which are common to users belonging to the set of users. The data refers, for example, to a web page or a data entry in the database 28 to be updated according to an input to the web page. As an example, for a given web page, when, if a user has an attribute value of a certain attribute of 11 and an attribute value of another attribute of 13, and access to the web page is granted to that user regardless of other attributes, the second storage unit 210 stores 143 (=11× 13) in association with the web page.

The calculation unit 220 receives identification information of a user (called a user ID) who requests access such that the user ID is included in a web page display request, for example. The calculation unit 220 then reads out, from the first storage unit 200, a plurality of attribute values corresponding to the user ID and calculates a product of at least two of the plurality of read attribute values. As an example, when 11, 13, and 17 are read out, a product of at least two of them, e.g., 143 (=11×13), is calculated. The calculation unit 220 calculates, for each combination of attribute values which includes at least two of the plurality of read attribute values, a product of attribute values belonging to each combination of attribute values. In the example where 11, 13, and 17 are read out, in addition to 143, 221 (=13×17), 187 (=11×17), and 2431 (=11×13×17) are calculated. The product calculation process may be efficiently performed using a cache, as will be described later.

The control unit 230 receives identification information (called a page ID) that identifies data to be accessed such that the page ID is included in a web page display request, for example. The control unit 230 then reads out, from the second storage unit 210, a product of attribute values in association with the page ID. The control unit 230 then compares the product of attribute values calculated by the calculation unit 220 with the read product of attribute values. When there are a plurality of calculated products of attribute values, the control unit 230 compares each of the calculated products of attribute values with the read product of attribute values. When a plurality of products of attribute values are stored in association with one same web page, the control unit 230 compares each of the calculated products of attribute values with each of the read products of attribute values.

On condition that there is a match, the control unit 230 performs a process for accepting the user as a target of access control to the data. The phrase "there is a match" refers to that any of the calculated products of attribute values matches any of the read products of attribute values. The process for accepting the user as a target of access control to the data refers, for example, to a process of granting, if it is predetermined that access is granted only when there is a matched product of attribute values, access to the data by the user. In contrast, if it is predetermined that access is denied only when there is a matched product of attribute values, the control unit 230 denies access to the data by the user on condition that there is a matched product.

FIG. 3 shows an exemplary data structure of the first storage unit 200. The first storage unit 200 stores a plurality of attribute values which identify a plurality of attributes of a user, such that the attribute values are associated with each user. The attribute values are illustrated in an attribute field in the drawing. Furthermore, the first storage unit 200 calculates and stores in advance a product of at least two of a plurality of attribute values corresponding to a user, in association with respective users. The products of attribute values are illustrated in a cache field in the drawing. Note, however, that values in cache C are not products of attribute values but attribute values themselves. As such, the first storage unit 200 may further store a frequently used attribute values themselves in the cache field.

As described above, a plurality of attribute values are selected in advance from a combination of integers which are relatively prime and then assigned. In the example of FIG. 3, the attribute of a department of a user is either distribution department or sales department. To the attribute values of this attribute are assigned a prime number 103 indicating the distribution department and a prime number 101 indicating the sales department. Similarly, for the attribute of a job title of a user, a prime number 3 indicating manager and a prime number 2 indicating assistant manager are assigned to the attribute values. In this example, a prime number 3 is also assigned to an attribute value indicating director. As such, an attribute value may not be one that can fully identify an attribute and may be one that collectively identifies a plurality of pieces of attribute information which are actually different from each other, depending on the circumstances of access control.

Thereafter, similarly, for the attribute of a work location of a user, a prime number 11 indicating eastern Japan and a prime number 13 indicating western Japan are selected as attribute values, and for the attribute of a group to which a user belongs, a prime number 67 indicating group B and a prime number 61 indicating group A are selected as attribute values.

As an example of a cache, the first storage unit 200 calculates and stores in advance in a cache A field a product of an attribute value of a department and an attribute value of a job title. For example, for user 1, the first storage unit 200 stores 309 which is the product of a prime number 103 indicating the distribution department and a prime number 3 indicating manager. In addition, the first storage unit 200 calculates and stores in advance in a cache B field a product of an attribute value of a department and an attribute value of a work location.

Figures 4A, 4B:
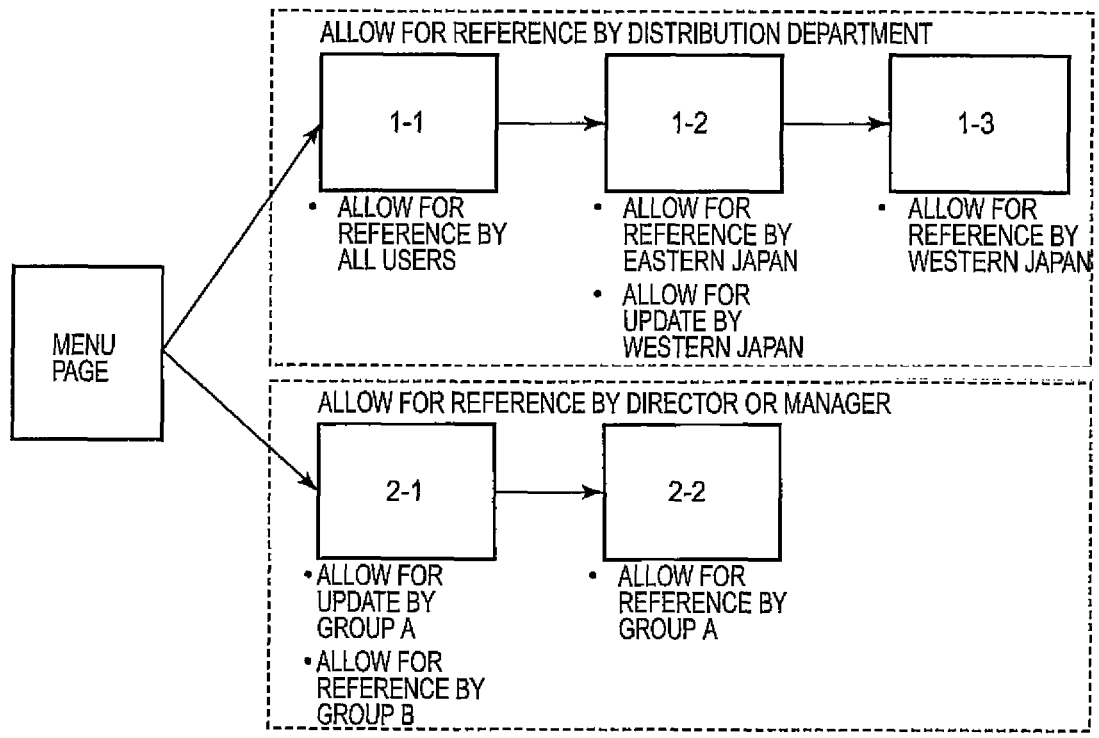
FIG. 4A is a diagram showing an exemplary screen configuration of a web page which is the target of access control.
FIG. 4B is a diagram showing an exemplary data structure of a second storage unit.

FIG. 4A shows an exemplary screen configuration of a web page which is the target of access control. When a given item is selected on a menu page which is an initial screen, a screen 1-1 is displayed. Note that the screen 1-1 and subsequent screens 1-2 and 1-3 can be referred to only by users whose serviced department attributes are the distribution department. Therefore, the web server 20 denies access from any other user. For the screen 1-1, reference by all users of the distribution department is allowed. On the other hand, for the screen 1-2 to be displayed in response to an operation performed on the screen 1-1, users who are in the distribution department and in eastern Japan are allowed for read-only reference, and users in the distribution department and in western Japan are allowed not only for read reference but also for an update. As such, access control may involve not only the grant/denial of access but also control of the type of access to be granted. For the screen 1-3 to be displayed in response to an operation performed on the screen 1-2, reference is allowed only by users who are in the distribution department and in western Japan and thus access by users in eastern Japan is denied.

When another item is selected on the menu page, a screen 2-1 is displayed. Note that the screen 2-1 and a subsequent screen 2-2 can be referred to only by users whose job titles are either director or manager. Furthermore, for the screen 2-1, an update by directors or managers in group A is allowed, and directors or managers in group B are allowed only for read reference. For the screen 2-2 to be displayed in response to an operation performed on the screen 2-1, reference by the directors or managers in the group A is allowed, and access by users in any other group, regardless of whether the users are directors or managers, is not allowed.

FIG. 4B shows an exemplary data structure of the second storage unit 210. FIG. 4B is associated with the screen configuration shown in FIG. 4A. The second storage unit 210 is provided to show, in association with respective data (e.g., page) to be accessed, a set of users as targets of access control to the data, and stores a product of at least two attribute values which are common to users belonging to the set of users. The second storage unit 210 further stores type information indicating whether read-only reference to data is allowed or even an update to the data is allowed, in association with respective data to be accessed.

As an example, the second storage unit 210 stores, for a page 1-2, 1133 which is the product of an attribute value 103 indicating the distribution department which is a serviced department and an attribute value 11 indicating eastern Japan which is a work location. In addition, the second storage unit 210 stores, for this page, "reference" which is an access type for read-only. By referring to this entry, the control unit 230 can allow a set of users in the distribution department and in eastern Japan to refer to the page 1-2.

Specifically, the calculation unit 220 reads out 103, 3, 11, and 67 as a plurality of attribute values of a given user (user 1). The calculation unit 220 then calculates, for each combination including at least two of the attribute values, a product of attribute values belonging to each combination. For example, the products are 309 (=103×3), 33 (=3×11), 1133 (=11×103), and the like. Since any of the calculated products matches the product 1133 associated with the page 1-2, the control unit 230 performs access control according to type information associated with the user. Specifically, since the type information associated with the matched product of attribute values indicates allowance for reference to data, the control unit 230 allows for read reference to the data.

As another example, the second storage unit 210 stores, for a page 2-1, 183 which is the product of an attribute value 3 indicating a job title of a serviced department and an attribute value 61 indicating the group A which is a serviced group. In addition, the second storage unit 210 stores, for this page, "update" which is an access type. By referring to this entry, the control unit 230 can allow a set of users who are directors or managers and in the group A to update the page 2-1.

Specifically, the calculation unit 220 reads out 103, 3, 13, and 61 as a plurality of attribute values of a given user (user 3). The calculation unit 220 then calculates, for each combination including at least two of the attribute values, a product of attribute values belonging to each combination. For example, the products are 309 (=103×3), 39 (=3×13), 183 (=3×61), and the like. Since any of the calculated products matches the product 183 associated with the page 2-1, the control unit 230 performs access control according to type information associated with the user. Specifically, since the type information associated with the matched product of attribute values indicates allowance for an update to data, the control unit 230 allows for an update to the data. Note that when there is no matched product of attribute values the control unit 230 denies access to the data.

Note that the second storage unit 210 stores, for the page 1-1, not only the product of attribute values but also an attribute value itself. This indicates that if a user has that attribute value, the user is allowed for access regardless of other attributes. Specifically, the control unit 230 compares not only products of attribute values read out from the first storage unit 200 but also an attribute value itself with an entry of a product of attribute values in the second storage unit 210 and if there is a match, then a user is the target of access control. As such, by allowing not only products of attribute values but also an attribute value itself to be set, flexible specification of a set of users is enabled.

As described above, according to the information system 10 described with reference to FIGS. 1 to 4, by storing a product of prime number values for each web page, a set of users which are targets of access control can be managed. This makes the number of data entries in a column direction (i.e., the number of columns) in the second storage unit 210 smaller, and thus, the required capacity of the second storage unit 210 can be reduced. Furthermore, even when a new attribute is added or when a user who is the target of access control is added, there is no need to add a new column to the second storage unit 210. Therefore, even when a database technique in which addition of a column is difficult is adopted, the change/extension of access control is facilitated.

Figure 5:
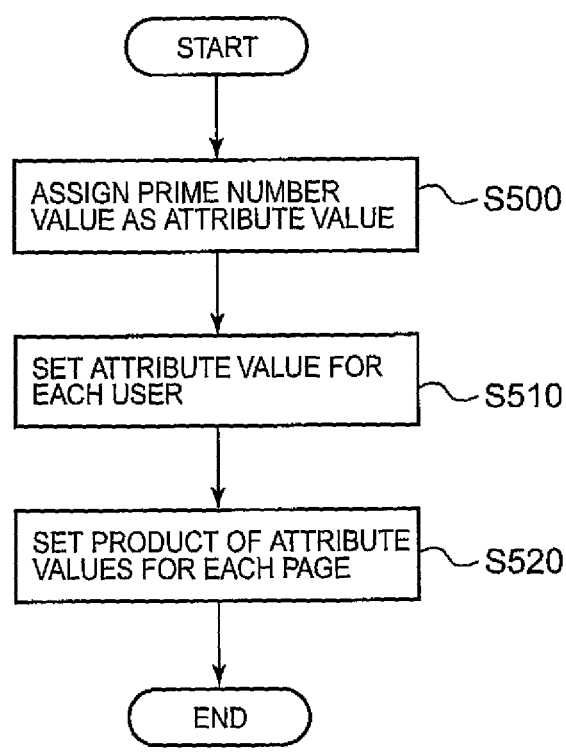
FIG. 5 is a flowchart of a process of setting attributes for allowing the information system to perform access control.

FIG. 5 shows a flowchart of a process of setting attributes for allowing the information system 10 to perform access control. A user such as an engineer or system administrator assigns, as a plurality of attribute values, attribute values selected from a plurality of integers which are relatively prime, e.g., prime numbers (S500). For an attribute value, a value is assigned which is different not only from other attribute values of an attribute to which the attribute value belongs but also from attribute values of other attributes. The user then stores the plurality of attribute values in the first storage unit 200 using the assigned attribute values such that the plurality of attribute values are associated with each user (S510). Then, in order to show a set of users which are targets of access control to a web page, the user calculates, for each web page, a product of attribute values which are common to users of the set and then stores the calculated products in the second storage unit 210 (S520).

Figure 6:
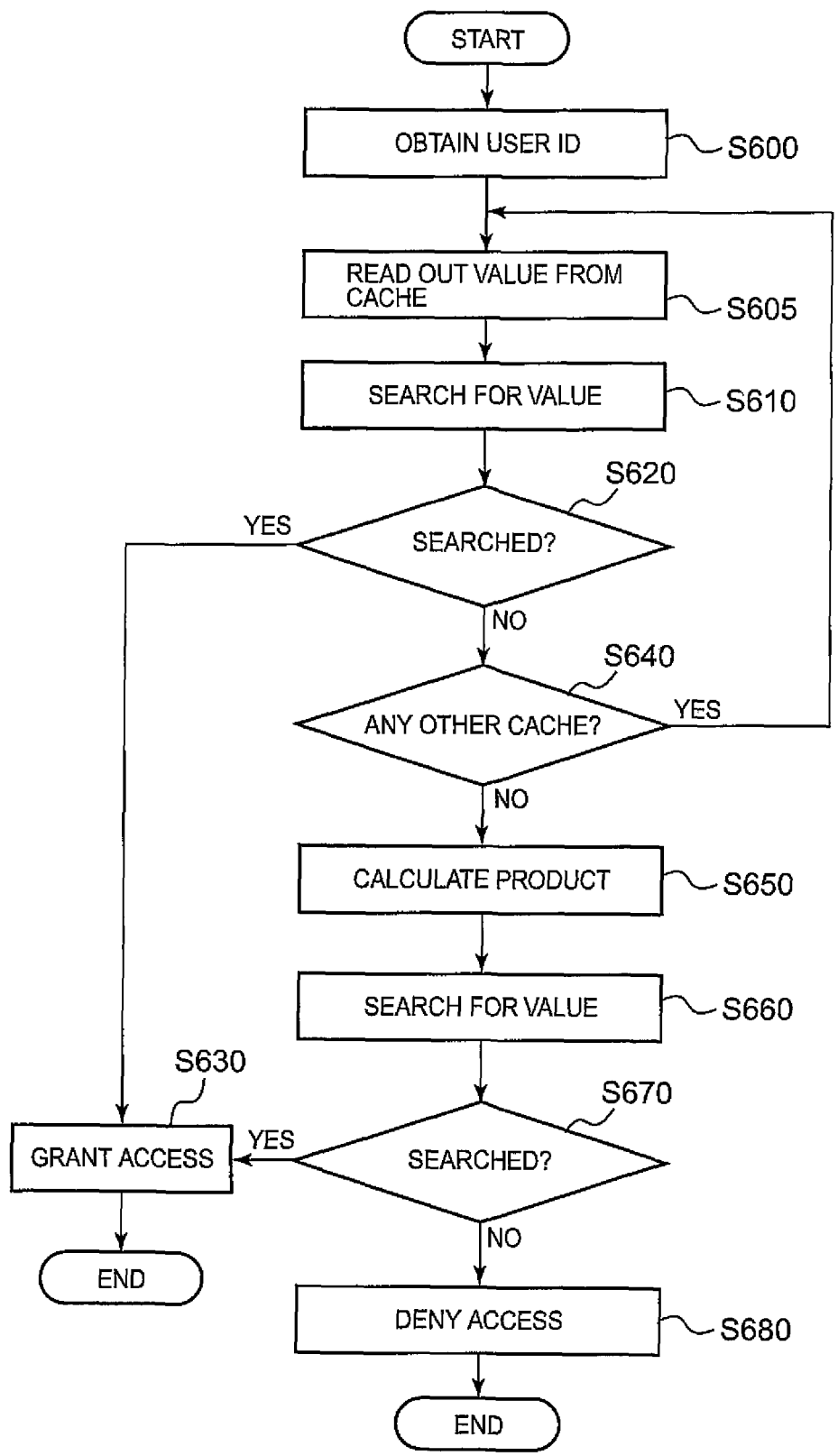
FIG. 6 is a flowchart of a process of controlling access to a page by the information system.

FIG. 6 is a flowchart of a process of controlling access to a page by the information system 10. The information system 10 performs the following process in response to, for example, a request for screen transition from a web page being displayed on the screen of the terminal apparatus 15 to a next web page. The calculation unit 220 obtains a user ID of a user who requests access from, for example, an HTTP access request message in which a URL and the like of the next web page are specified (S600). The calculation unit 220 then reads out, from the cache field of the first storage unit 200, products of attribute values corresponding to the user ID (S605). Then, the control unit 230 searches the second storage unit 210 and determines whether any of the read products of attribute values matches a product of attribute values which is associated with a page to be accessed in the second storage unit 210 (S610). The page to be accessed namely refers to the next web page specified by a URL or the like.

On condition that a matched product of attribute values is searched (YES at S620), the control unit 230 considers the user as a target of access control to the web page (S630). For example, the control unit 230 grants access by the user. As a result of the granting of access, the control unit 230 transmits information on the next web page to the terminal apparatus 15 and displays the next web page on the screen of the terminal apparatus 15. On the other hand, on condition that a matched product of attribute values is not searched (NO at S620), the calculation unit 220 determines whether there is a product of attribute values which is associated with the user and which is not yet read out from the cache field (S640). If there is a product of attribute values which is not yet read out (YES at S640), then the web server 20 returns to S605 and continues the process.

If there is no product of attribute values which is not yet read out (NO at S640), then the calculation unit 220 reads out, from the attribute field of the first storage unit 200, a plurality of attribute values corresponding to the user ID and calculates, for each combination including at least two of the plurality of read attribute values, a product of attribute values belonging to each combination (S650). For efficiency of the process, the calculation unit 220 may calculate a product of a given combination of attribute values by calculating a product of a product of attribute values read out from the cache field and another read attribute value.

The control unit 230 then searches the second storage unit 210 and reads out, from the second storage unit 210, a product of attribute values which are associated with a page ID and then compares the products of attribute values calculated by the calculation unit 220 with the read product of attribute values (S660). On condition that a matched product of attribute values is searched (YES at S670), the control unit 230 performs a process with the user being the target of access control to the web page (S630). On the other hand, on condition that a matched product of attribute values is not searched (NO at S670), the control unit 230 does not perform a process for accepting the user as a target of access control to the web page (S680). For example, the control unit 230 denies access to the web page by the user. As a result of the denial of access, the control unit 230 may notify the terminal apparatus 15 of the denial of access and display on the screen of the terminal apparatus 15 a screen showing such a fact.

Figures 7, 8:
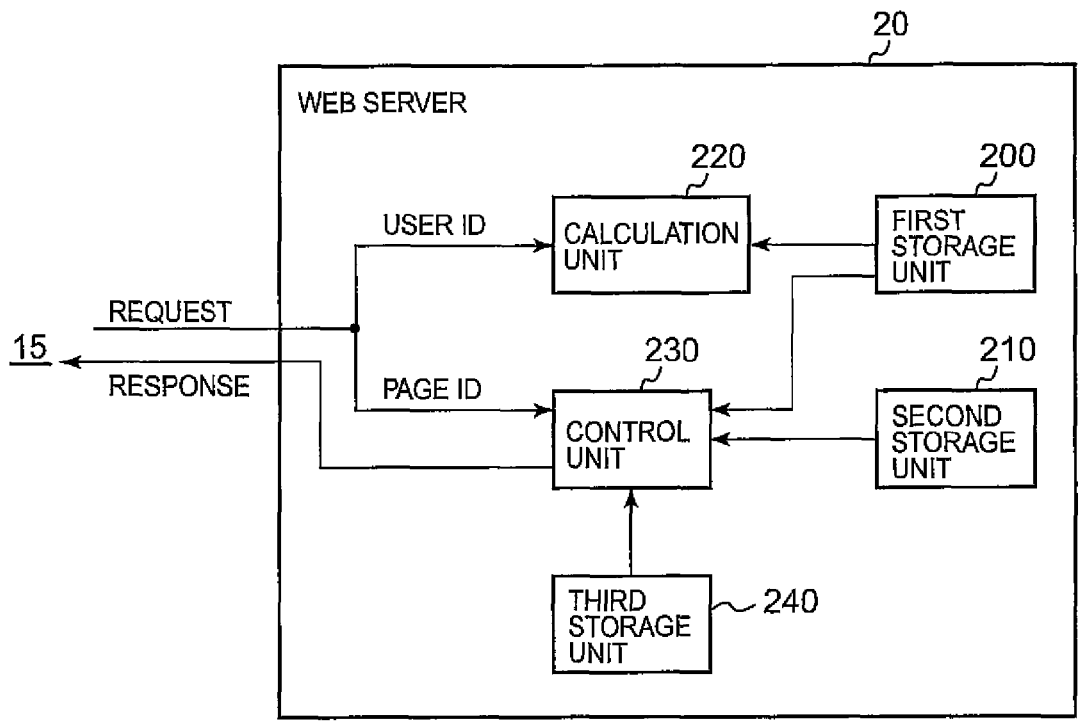
FIG. 7 is a diagram showing the overall configuration of a web server 20 according to a variant of the embodiment.
FIG. 8 is a diagram showing an exemplary data structure of a third storage unit 240 in the variant of the embodiment.

FIG. 7 shows the overall configuration of a web server 20 according to a variant of the present embodiment. The variant shows an example of a combination of a database in which a condition for controlling access to data is stored for respective data to be accessed, with a database which is shown in FIG. 4B and which implements control by products of prime number values. The variant is intended to facilitate management by a user or to increase compatibility with existing techniques, by managing a universal condition where change/extension is rare and a fluid condition where there is possible change/extension, such that the conditions are distinguished from each other.

The web server 20 further includes, in addition to the components of the web server 20 shown in FIG. 20, a third storage unit 240. A specific example of the third storage unit 240 is shown in FIG. 8.

FIG. 8 shows an exemplary data structure of the third storage unit 240 in the variant of the present embodiment. The third storage unit 240 stores an attribute condition that a user should satisfy to grant access, in association with respective data to which access is to be granted. For example, the third storage unit 240 has a page ID field, a condition field, and a type information field. As an example, the third storage unit 240 stores, for a page 1-1, information indicating whether the attribute of a job title is an executive or whether the attribute of a serviced department is system department, as a condition for allowing for read-only reference to the page and an update to a database related to the page.

In the variant, the control unit 230 performs access control based further on such information stored in the third storage unit 240. Specifically, first, the control unit 230 reads out, from the first storage unit 200, attribute values corresponding to a user who requests access and reads out, from the third storage unit 240, a condition corresponding to the user who requests access. The control unit 230 then determines whether the read attribute values satisfy the read condition. This condition determination is implemented by a comparison of attribute values by a conditional branch instruction. If the condition is satisfied, then the control unit 230 performs a process for accepting the user as a target of access control. In the example of FIG. 8, both read reference and an update are allowed.

On the other hand, on condition that the read attribute values do not satisfy the read condition, the control unit 230 performs the above-described process using products of attribute values. Specifically, the control unit 230 determines whether products of attribute values calculated by the calculation unit 220 match a product of attribute values stored in the second storage unit 210.

As described above, according to the variant, access control based on a condition can be combined with access control by products of attribute values. By this, a condition that is universal and difficult to change and a condition that possibly changes are managed so as to be distinguished from each other and the change/extension of the condition that possibly changes is facilitated.

Figure 9:
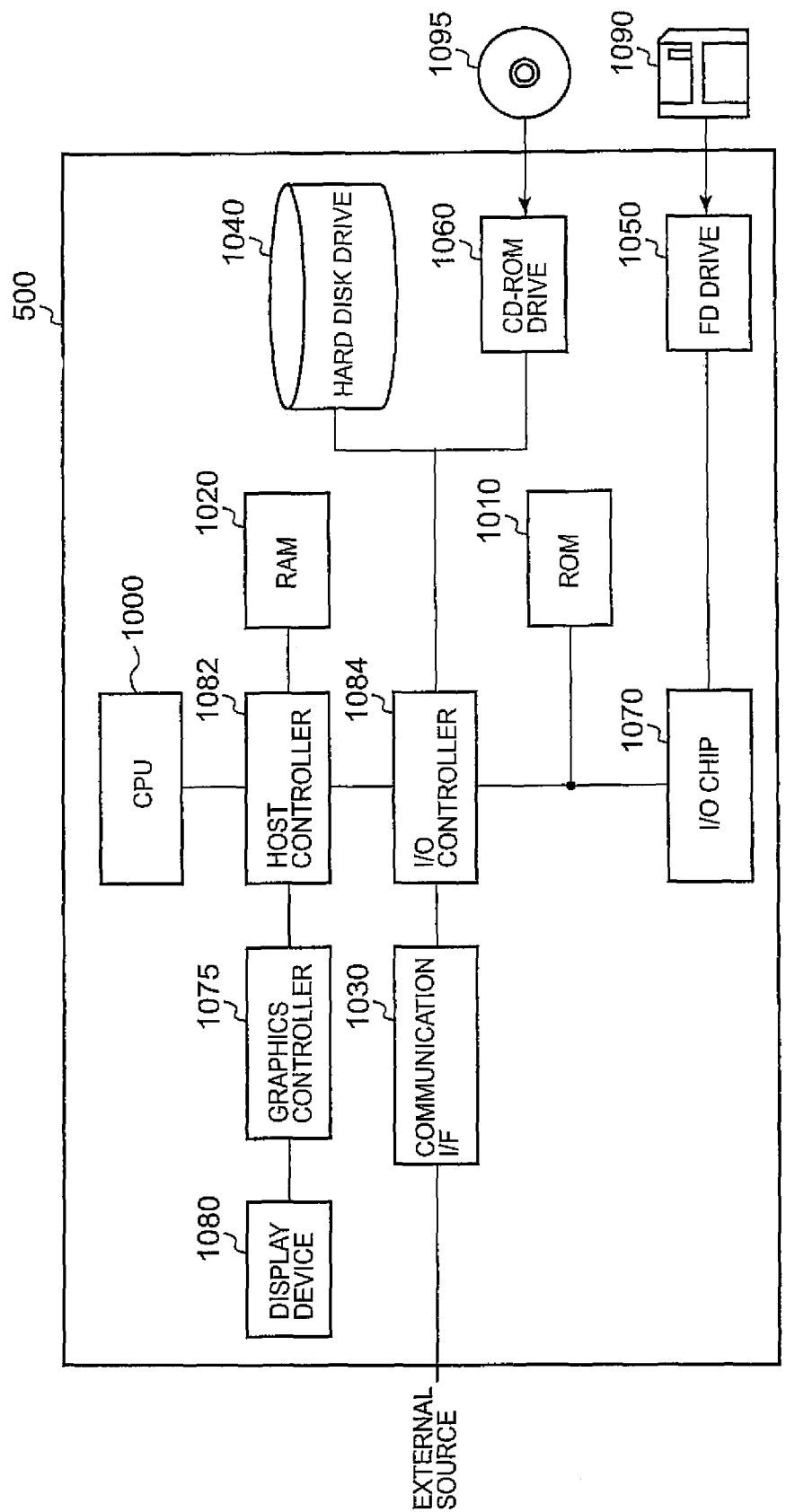
FIG. 9 is a diagram showing an exemplary hardware configuration of an information processing apparatus which functions as the web server according to the embodiment or the variant of the embodiment.

FIG. 9 shows an exemplary hardware configuration of an information processing apparatus 500 which functions as the web server 20 according to the present embodiment or the variant of the present embodiment. The information processing apparatus 500 includes a CPU peripheral section having a CPU 1000, a RAM 1020, and a graphics controller 1075 which are interconnected to one another by a host controller 1082; an input/output section having a communication interface 1030, a hard disk drive 1040, and a CD-ROM drive 1060 which are connected to the host controller 1082 by an input/output controller 1084; and a legacy input/output section having a ROM 1010, a flexible disk drive 1050, and an input/output chip 1070 which are connected to the input/output controller 1084.

The host controller 1082 connects the RAM 1020 to the CPU 1000 and the graphics controller 1075 which access the RAM 1020 at high transfer rate. The CPU 1000 operates based on programs stored in the ROM 1010 and the RAM 1020 and performs control of each section. The graphics controller 1075 obtains image data to be generated, by the CPU 1000 or the like, on a frame buffer provided in the RAM 1020 and displays the image data on a display device 1080.

Instead of this, the graphics controller 1075 may include therein a frame buffer that stores image data to be generated by the CPU 1000 or the like.

The input/output controller 1084 connects the host controller 1082 to the communication interface 1030, the hard disk drive 1040, and the CD-ROM drive 1060 which are relatively high-speed input/output devices. The communication interface 1030 communicates with an external apparatus via a network. The hard disk drive 1040 stores programs and data to be used by the information processing apparatus 500. For example, the above-described first storage unit 200, second storage unit 210, and third storage unit 240 are implemented by storage devices such as the hard disk drive 1040, for example. The CD-ROM drive 1060 reads a program or data from a CD-ROM 1095 and provides the read program or data to the RAM 1020 or the hard disk drive 1040.

To the input/output controller 1084 are connected the ROM 1010 and relatively low-speed input/output devices such as the flexible disk drive 1050 and the input/output chip 1070. The ROM 1010 stores a boot program which is executed by the CPU 1000 upon startup of the information processing apparatus 500, a program that depends on the hardware of the information processing apparatus 500, and the like. The flexible disk drive 1050 reads a program or data from a flexible disk 1090 and provides the read program or data to the RAM 1020 or the hard disk drive 1040 via the input/output chip 1070. The input/output chip 1070 connects the flexible disk 1090 or various input/output devices via a parallel port, a serial port, a keyboard port, or a mouse port, for example.

A program to be provided to the information processing apparatus 500 is stored in a recording medium, such as the flexible disk 1090, the CD-ROM 1095, or an IC card, and then provided by a user. The program is read out from the recording medium via the input/output chip 1070 and/or the input/output controller 1084 and then installed on and executed by the information processing apparatus 500. Operations to be performed by the program prompting the information processing apparatus 500 or the like are the same as those of the web server 20 described in FIGS. 1 to 8 and thus description thereof will be omitted.

Programs described above may be stored in an external storage medium. For the storage medium, in addition to the flexible disk 1090 and the CD-ROM 1095, optical recording media such as DVDs and PDs, magneto-optical recording media such as MDs, tape media, semiconductor memories such as IC cards, and the like can be used. It is also possible that a storage device, such as a hard disk or RAM, provided in a server system connected to a private communication network or the Internet is used as a recoding medium and a program is provided to the information processing apparatus 500 via the network.

The present invention has been described using an embodiment thereof; however, the technical scope of the present invention is not limited to the scope described in the aforementioned embodiment. It is obvious to those skilled in the art that various kinds of changes or modifications can be added to the aforementioned embodiment. It is obvious from the recitation of the appended claims that embodiments to which such changes or modifications are added are also included in the technical scope of the present invention.

The invention claimed is:

1. A system for controlling access to data, comprising:
a first storage unit for storing a plurality of attribute values respectively selected from a plurality of integers which are relatively prime, each attribute value identifying one of a plurality of attributes of a user, the attributes describing a common property of the user in association with respective users;
a second storage unit for associating data to be accessed with products of at least two of the plurality of attribute values, which are common to users belonging to a set of users, each product of the products indicating a combination of attributes required for the set of users as targets of access control to the data;
a calculation unit for reading out, from the first storage unit, a plurality of attribute values corresponding to a user who requests access and calculating a product of at least two of the plurality of read attribute values; and
a control unit for performing a process for accepting the user as a target of controlling access to the data, on condition that the calculated product of attribute values matches a product of attribute values stored in the second storage unit in association with the data to be accessed.

2. The system according to claim 1, wherein the first storage unit stores a plurality of attribute values selected from a plurality of prime numbers which are different from each other and identifying a plurality of attributes of users, in association with respective users.

3. The system according to claim 2, wherein
the calculation unit calculates, for each combination of attribute values which includes at least two of the plurality of read attribute values, a product of attribute values belonging to each combination of attribute values; and
the control unit performs a process for accepting the user as a target of access control, on condition that any of the calculated products of attribute values matches a product of attribute values stored in the second storage unit in association with the data to be accessed.

4. The system according to claim 2, wherein
the second storage unit further stores type information indicating whether read-only reference to the data is allowed or whether an update to the data is allowed, in association with respective data to be accessed; and
in a case where the calculated product of attribute values matches a product of attribute values stored in the second storage unit in association with the data to be accessed, the control unit: allows for read-only reference to the data, on condition that type information associated with the matched product of attribute values indicates allowance for read-only reference to data; allows for an update to the data, on condition that the type information associated with the matched product of attribute values indicates allowance for an update to data; and denies access to the data, on condition that the calculated product of attribute values does not match any of the products of attribute values.

5. The system according to claim 1, further comprising a third storage unit for storing an attribute condition that a user should satisfy to grant access, such that the condition is associated with respective data to which access is to be granted, wherein:
the control unit reads out, from the first storage unit, attribute values associated with a user who requests for access, reads out, from the third storage unit, a condition associated with the user who requests for access, and determines whether the product of attribute values calculated by the calculation unit matches the product of attribute values stored in the second storage unit, on condition that the read attribute values do not satisfy the read condition.

6. The system according to claim 1, wherein
the first storage unit further calculates and stores in advance a product of at least two of a plurality of attribute values corresponding to a user, in association with respective users; and
the calculation unit reads out, from the first storage unit, a product of attribute values calculated and stored in advance and calculates a product of the product of attribute values and another attribute value corresponding to the user, on condition that the product of attribute values is not stored in the second storage unit in association with the data to be accessed.

7. The system according to claim 1, wherein
the system controls access to a plurality of web pages;
the second storage unit for storing a product of at least two attribute values corresponding to a user who is a target of controlling access to a web page, in association with respective web pages to be accessed;
the calculation unit reads out, from the first storage unit, a plurality of attribute values corresponding to a user who makes the request and calculates a product of at least two of the plurality of read attribute values, in response to a request for screen transition from a web page being displayed to a next web page; and
the control unit performs a process for accepting the user as a target of access control to the next web page, on condition that the calculated product of attribute values matches a product of attribute values stored in the second storage unit in association with the next web page.

8. A method for controlling access using a system for controlling access to data, the system including
a first storage unit for storing a plurality of attribute values respectively selected from a plurality of integers which are relatively prime, each attribute value identifying one of a plurality of attributes of a user, the attributes describing a common property of the user in association with respective users; and
a second storage unit for associating data to be accessed with products of at least two of the plurality of attribute values, which are common to users belonging to a set of users, each product of the products indicating a combination of attributes required for the set of users as targets of access control to the data, the method comprising:
reading out a plurality of attribute values corresponding to a user who requests access from the first storage unit, and calculating a product of at least two of the plurality of read attribute values by an information processing apparatus; and
performing a process for accepting the user as a target of controlling access to the data by the information processing apparatus, on condition that the calculated product of attribute values matches a product of attribute values stored in the second storage unit in association with the data to be accessed.

9. The method according to claim 8, further comprising:
storing, in the first storage unit, a plurality of attribute values selected from a plurality of prime numbers which are different from each other and identifying a plurality of attributes of users, in association with respective users.

10. The method according to claim 9, further comprising:
calculating, for each combination of attribute values which includes at least two of the plurality of read attribute values, a product of attribute values belonging to each combination of attribute values; and
performing a process for accepting the user as a target of access control, on condition that any of the calculated products of attribute values matches a product of attribute values stored in the second storage unit in association with the data to be accessed.

11. The method according to claim 9, further comprising:
storing, in the second storage unit, type information indicating whether read-only reference to the data is allowed or whether an update to the data is allowed, in association with respective data to be accessed; and
in a case where the calculated product of attribute values matches a product of attribute values stored in the second storage unit in association with the data to be accessed, allowing for read-only reference to the data, on condition that type information associated with the matched product of attribute values indicates allowance for read-only reference to data; allowing for an update to the data, on condition that the type information associated with the matched product of attribute values indicates allowance for an update to data; and denying access to the data, on condition that the calculated product of attribute values does not match any of the products of attribute values.

12. The method according to claim 8, wherein the system further comprising a third storage unit for storing an attribute condition that a user should satisfy to grant access, such that the condition is associated with respective data to which access is to be granted, the method further comprising:
reading out, from the first storage unit, attribute values associated with a user who requests for access; reading out, from the third storage unit, a condition associated with the user who requests for access; and determining whether the product of attribute values matches the product of attribute values stored in the second storage unit, on condition that the read attribute values do not satisfy the read condition.

13. The method according to claim 8, further comprising:
calculating and storing, in the first storage unit, in advance a product of at least two of a plurality of attribute values corresponding to a user, in association with respective users; and
reading out, from the first storage unit, a product of attribute values calculated and stored in advance and calculates a product of the product of attribute values and another attribute value corresponding to the user, on condition that the product of attribute values is not stored in the second storage unit in association with the data to be accessed.

14. The method according to claim 8, wherein the system controls access to a plurality of web pages, the method further comprising:
storing, in the second storage unit, a product of at least two attribute values corresponding to a user who is a target of controlling access to a web page, in association with respective web pages to be accessed;
reading out, from the first storage unit, a plurality of attribute values corresponding to a user who makes the request and calculates a product of at least two of the plurality of read attribute values, in response to a request for screen transition from a web page being displayed to a next web page; and
performing a process for accepting the user as a target of access control to the next web page, on condition that the calculated product of attribute values matches a product of attribute values stored in the second storage unit in association with the next web page.

15. A program product stored on a computer readable storage medium for causing an information processing apparatus to function as a system for controlling access to data, the program product causing the information processing apparatus to function as:
- a first storage unit for storing a plurality of attribute values respectively selected from a plurality of integers which are relatively prime, each attribute value identifying one of a plurality of attributes of a user, the attributes describing a common property of the user in association with respective users;
- a second storage unit for associating data to be accessed with products of at least two of the plurality of attribute values, which are common to users belonging to a set of users, each product of the products indicating a combination of attributes required for the set of users as targets of access control to the data;
- a calculation unit for reading out, from the first storage unit, a plurality of attribute values corresponding to a user who requests access, and calculating a product of at least two of the plurality of read attribute values; and
- a control unit for performing a process for accepting the user as a target of controlling access to the data, on condition that the calculated product of attribute values matches a product of attribute values stored in the second storage unit in association with the data to be accessed.

* * * * *